United States Patent [19]
Hibbs

[11] Patent Number: 5,499,899
[45] Date of Patent: Mar. 19, 1996

[54] MOBILE CONVEYOR SYSTEM

[75] Inventor: J. C. Hibbs, Santa Cruz, Calif.

[73] Assignee: Granite Rock Company, Watsonville, Calif.

[21] Appl. No.: 315,463

[22] Filed: Sep. 30, 1994

Related U.S. Application Data

[62] Division of Ser. No. 967,348, Oct. 28, 1992, Pat. No. 5,360,097.

[51] Int. Cl.$^6$ .................................................. B65G 67/24
[52] U.S. Cl. .................................................................. 414/786
[58] Field of Search .................................... 198/313, 632, 198/823, 861.2, 861.3, 311; 414/345, 346, 390, 528, 523, 786

[56] References Cited

U.S. PATENT DOCUMENTS

| | | | |
|---|---|---|---|
| 3,216,552 | 11/1965 | Lister | 198/313 |
| 3,599,784 | 8/1971 | Rossi | 198/313 |
| 3,826,353 | 7/1974 | Greasley | 198/313 |
| 4,049,328 | 9/1977 | Ouska et al. | 198/830 X |
| 4,427,104 | 1/1984 | Reid, Jr. | 198/313 X |
| 4,813,839 | 3/1989 | Compton | 414/345 |
| 4,932,516 | 6/1990 | Andersson | 198/823 |
| 5,360,097 | 11/1994 | Hibbs | 198/313 |

FOREIGN PATENT DOCUMENTS 880149   10/1961   United Kingdom .................. 198/313

Primary Examiner—Joseph E. Valenza
Attorney, Agent, or Firm—Townsend and Townsend and Crew

[57] ABSTRACT

A conveyor is rotatably mounted to a vehicle. The conveyor includes a plurality of frame members pivotally coupled to one another, such that they can be placed in overlapping relationship for transport with the vehicle or unfolded for use. An extension member is slidably coupled to one of the frame members such that the conveyor can be extended beneath a rail car for receiving material therefrom.

6 Claims, 9 Drawing Sheets

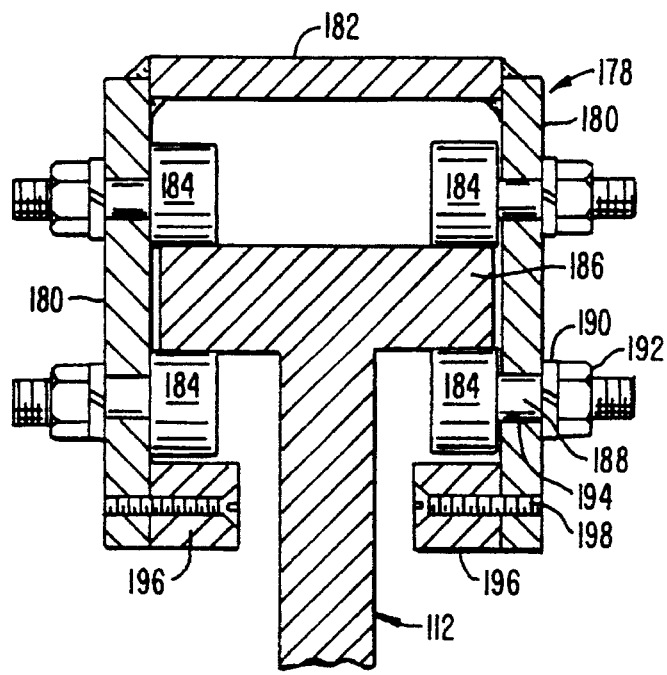
FIG. IF.
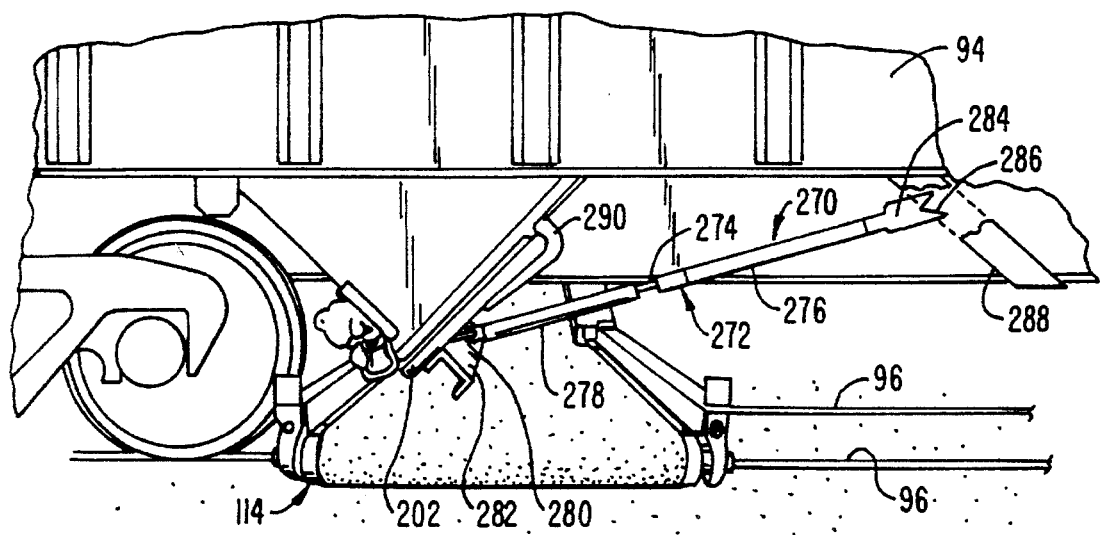
FIG. IG.

MOBILE CONVEYOR SYSTEM

This is a division of application Ser. No. 07/967,348 filed Oct. 28, 1992, U.S. Pat. No. 5,360,097.

BACKGROUND OF THE INVENTION

The present invention relates to material handling generally, and more particularly to a mobile system for loading and unloading railroad cars.

Heretofore various methods for unloading rail cars have been used. One such method involves using a fixed unloading pit that is installed under a rail line. With this method a conveyor is positioned in the pit to transfer the cargo discharged from a rail car to another location, such as a stockpile, for subsequent handling. Among the drawbacks of this system is that it is a fixed site system that limits loading or unloading of rail cars to a particular site, while preferred unloading operations may change to a location along the track far from the fixed pit. These systems also have considerable installation costs due to the substantial amount of excavation required to build the pit beneath the rail line and the construction of support structure to support the rail track above the pit.

Another system for loading and unloading rail cars is disclosed in U.S. Pat. Nos. 4,175,902 and 4,190,394, both to Herzog, et al. This system is comprised of a backhoe that is provided with brackets or special arms for support or engagement with the upper surface of the rail car side walls enabling it to climb on top of a rail car and move from car to car. Although this system is mobile and permits loading and unloading operations to be conducted along a track far from a depot, yard, or other facility where cranes may be used, it is generally limited to unloading rail cars from the top side. Thus, when a backhoe bucket is used with the tractor to unload aggregate from the top of the rail car, a certain amount of material at the bottom of the rail car (which is inaccessible to the bucket due to the bucket configuration) is left behind, thereby decreasing shipping efficiencies. In addition, the material left in the bottom of the rail car generally must be cleaned out prior to reloading the rail car with other material in order to avoid contamination of the subsequently loaded material.

Self-unloading trains also have been constructed in an attempt to improve material handling efficiency. Generally, these trains are a series of two to sixteen rail cars that are interconnected by a conveyor positioned beneath the rail cars. The conveyor leads to one end of the train where a swinging stacker conveyor is located. The swinging conveyor transports the material conveyed beneath the rail cars along the first conveyor to a stockpile, truck, or barge, for example. Although the system can be very effective in delivering large volumes of material by rail, a relatively large length of substantially straight railroad track is required in order that the conveyor belt beneath the rail cars, which transfers material to the swinging stacker conveyor, is sufficiently straight for proper conveyance. In some instances, as much as 1,000 feet of straight track may be required. Another disadvantage of the system is that the cars are custom made for this particular use in such a way that standard bottom-dump rail cars cannot be unloaded with this system. The system's flexibility also is diminished because of the way the bottom side conveyor is integrated with the rail cars. For example, a two car system is not readily converted to a four car system. Thus, when shipping demands double, an additional two car system must be acquired; otherwise, the single two car system must return to the point of origin to reload. The logistics of making two shipments as opposed to one can greatly restrict the system's use. In addition, when hauling different products, such as sand and stone, on one train, contamination of material can result while unloading. This happens when the gate of a rail car having different material than that being conveyed leaks.

SUMMARY OF THE INVENTION

The present invention is directed to a mobile conveying system that avoids the problems and disadvantages of the prior art. In accordance with the principles of the present invention, a mobile vehicle, such as a truck, is provided with a conveyor having a first configuration for transport and a second configuration for unloading cargo or material from the bottom of rail cars and conveying that material to a stockpile or another vehicle for further transport. The conveyor includes a plurality of sections which are pivotally interconnected such that the conveyor can be folded up when the vehicle is driven on a highway or road and unfolded to provide a conveyor having a span sufficient to convey material from beneath a rail car to the open top of a truck, for example. The conveyor also includes a sliding portion or extension member which is slidably coupled to one of the sections, and angled thereto, such that the extension member can be extended to a location beneath the rail car where material is discharged from the rail car onto the extension member.

With this conveyor system, unloading operations can be performed at sites along a track far from a depot or other facility where unloading equipment such as cranes are available. In this way, gravel, sand, aggregates, and the like, can be transported as close to the site where the materials are to be used as is possible by rail. The mobile conveying system of the present invention then can be used to unload the cargo from the rail cars into a truck which then needs only travel a short distance to where the material is to be used. Not only does the system provide flexibility in that the mobile conveyor can be positioned adjacent to any bottom-dump rail car, for transferring material from the rail car to a truck, for example, but it allows the train to get close to the site where the material is to be used, thereby reducing the frequency of truck traffic transporting materials by road.

The above is a brief description of some deficiencies in the prior art and advantages of the present invention. Other features, advantages, and embodiments of the invention will be apparent to those skilled in the art from the following description, accompanying drawings and appended claims.

BRIEF DESCRIPTION OF THE DRAWINGS

FIG. 1F is a cross-sectional view of the sliding mechanism for the extension member that allows its extension as illustrated in FIG. 1E;

FIG. 1G is an end view of the extension member in the extended position of FIG. 1E illustrating a device for metering the amount of material to be unloaded onto the conveyor in accordance with the present invention;

DESCRIPTION OF THE PREFERRED EMBODIMENT

Figure 1A:
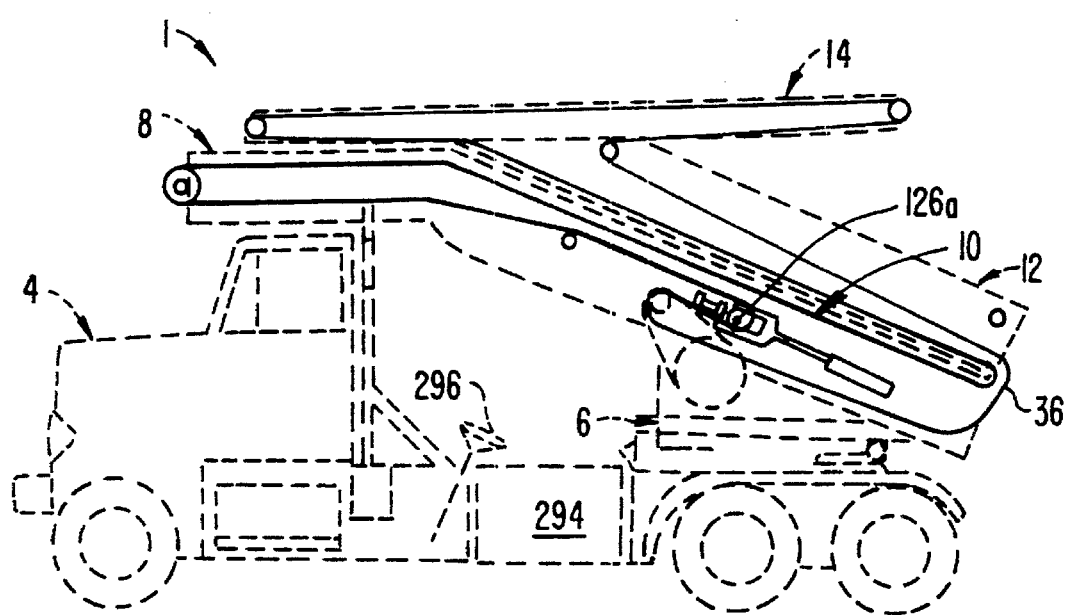
FIG. 1A is a side elevational view of the mobile conveyor system in accordance with the principles of the present invention with the conveyor in the transport position.

Referring to the drawings in detail, wherein like numerals indicate like elements, mobile conveyor system 1 is illustrated in accordance with the principles of the present invention. Although conveyor system 1 is described in conjunction with unloading bottom-dump rail cars, it should be understood that the system can be used to unload other containers.

Figure 1B:
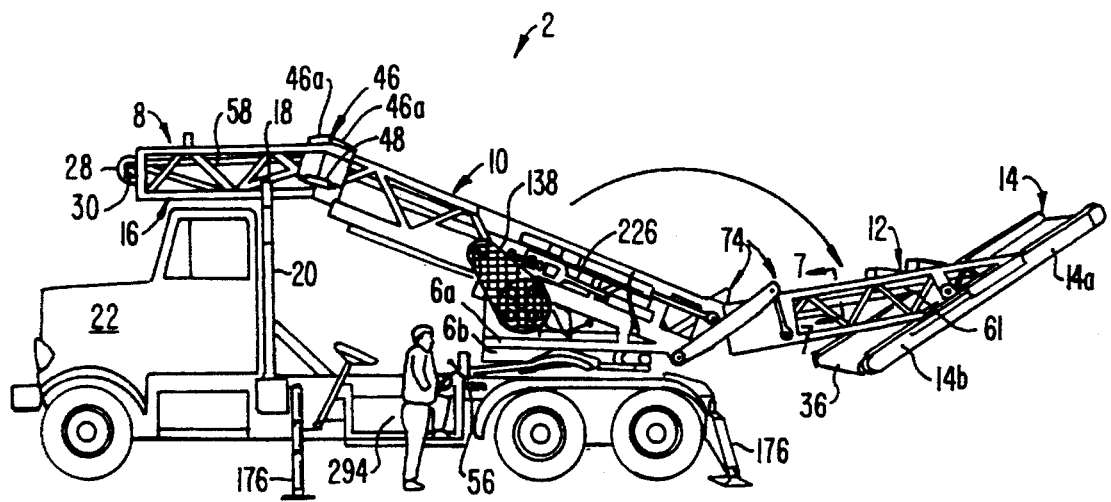
FIG. 1B is a side elevational view of the conveyor of FIG. 1A partially unfolded.
Figure 1C:
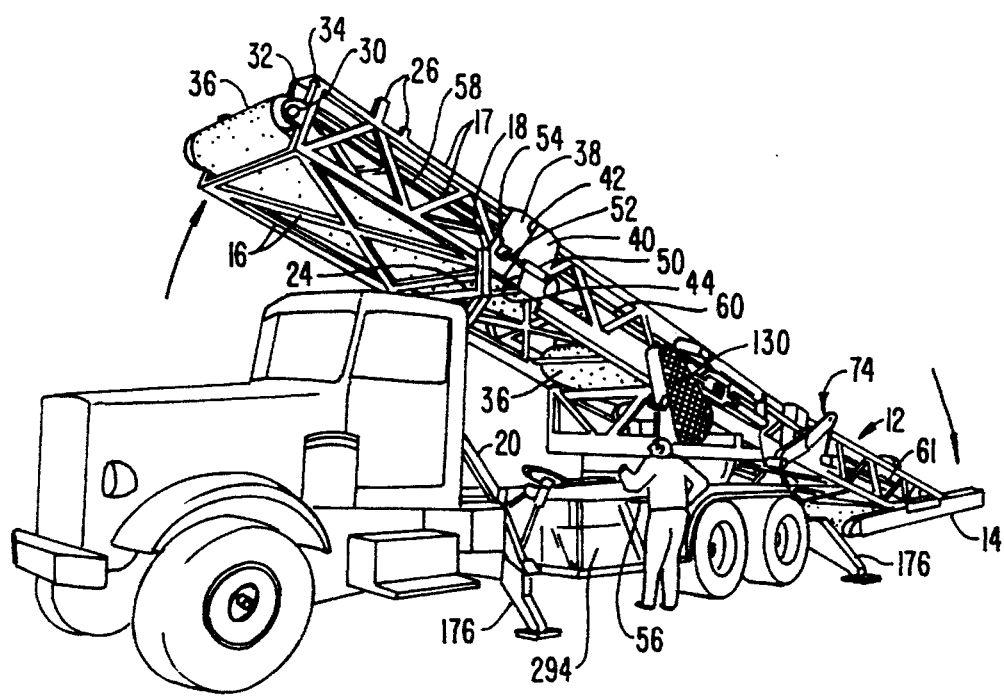
FIG. 1C is a perspective view of the conveyor of FIG. 1A unfolded.
Figure 1D:
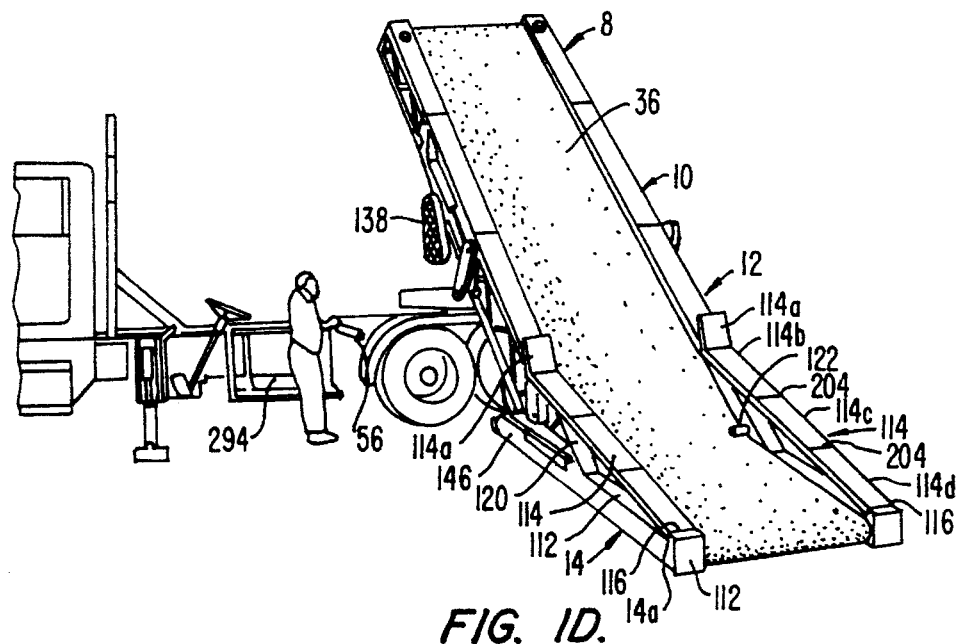
FIG. 1D is a perspective view of the conveyor of FIG. 1A rotated to a position generally normal to the conveyor truck prior to positioning the conveyor extension member underneath a rail car.
Figure 1E:
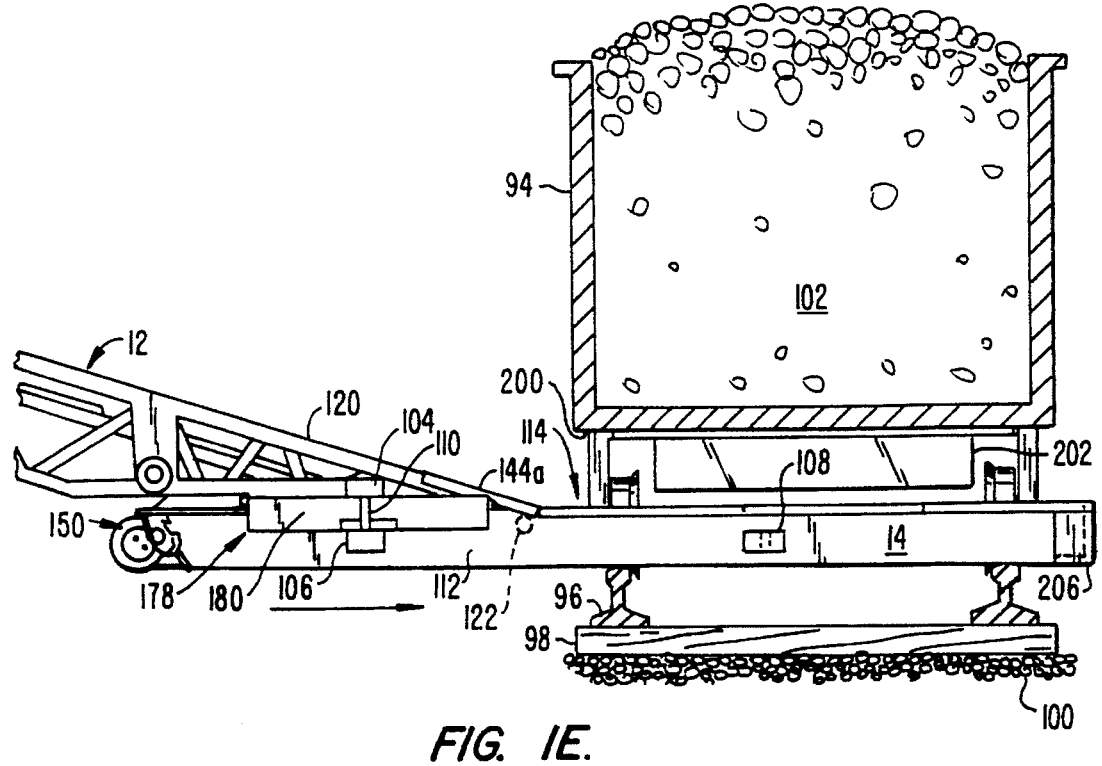
FIG. 1E is a side elevational view of the extension member of the conveyor of FIG. 1A extended so as to be positioned underneath the rail car.

Referring to FIGS. 1A–G, the conveyor system generally includes conveyor 2 which is rotatably mounted to truck 4 by a turret assembly 6 having a construction conventional to one of ordinary skill. Specifically, conveyor 2 is mounted to the frame 6a of turret assembly 6 which also includes platform 6b rotatably coupled to truck 4 as is conventional in the art. Conveyor 2 has a plurality of frame members pivotally coupled to one another such that they can be placed in an overlapping relationship for transporting the system to the site of a rail car (FIG. 1A). Once the truck has reached its destination, the conveyor is unfolded and rotated to an operable state for unloading materials from the rail car (FIG. 1D). The conveyor is then extended to reach beneath the rail car for bottom-dump unloading (FIG. 1E). The construction of frame members and the way in which the conveyor is extended are described in detail below.

Referring to FIG. 1B, conveyor 2 includes frame members 8, 10, and 12, hinge couplings between members 8 and 10 and 10 and 12, and extension member 14 which is slidably coupled to frame member 12 (i.e., frame members 8, 10, and 12 form a conveyor bridge to which extension member 14 is slidably coupled). Each frame member has a generally rectangular configuration and generally comprises upper side rails, lower side rails and bracing members that maintain the upper rails laterally spaced, the lower rails laterally spaced, and the upper rails vertically spaced from the lower rails. The bracing can be of any suitable configuration as would be apparent to one of ordinary skill. One suitable configuration for the lateral and vertical bracing is illustrated in FIG. 1C where the bracing and rails form bottom framework 16 and side framework 17 of the frame member 8. The bracing is substantially similar in frame members 10 and 12 except where modifications are necessary to accommodate structural elements such as turret 6. It also should be noted that upper frameworks 58, 60, and 61 of frame member 8, 10, and 12 form the base of the conveyor belt support. Thus, the frameworks are positioned below the upper rails of the frame members such that the side rails can form a conveyor bed and prevent material being conveyed from falling off the conveyor belt as will be described in more detail below. Frame member 8 is shown in FIG. 1B in the stored or transport position with its lower or bottom framework 16 supported between laterally spaced uprights 18 (one being hidden from view) of support frame 20 to prevent lateral movement of frame member 8 during transport. Support frame 20 is secured to the truck body by welding (for example) and further includes cross member 24 from which laterally spaced uprights 18 extend. Cross member 24 forms a support surface for bottom framework 16 to maintain frame member 8 vertically spaced above truck cab 22. Frame member 8 also includes uprights 26, i.e., uprights which extend from the upper sides of its framework for preventing lateral movement of extension member 14 during transport. Referring to FIG. 1A, frame member 12 overlaps frame member 10 and the forward portion 14a of extension member 14 overlaps frame member 8 in the transport position. As evident from the drawings, the angle formed between the upper portion of frame member 12 and the upper portion of forward portion 14a of the extension member is configured such that these elements can cooperatively engage the upper surfaces of frame members 8 and 10 to provide a compact structure when the conveyor is folded into the storage or transport position.

Frame member 8 further includes an idle roller 28 having an axle 30 rotatably mounted in support 32 which is secured to or extends from vertical strut 34 of frame member 8. Axle 30 can be mounted within support 32 by way of bearings as is conventional to one of skill in the art. Endless conveyor belt 36 is trained about an array of rollers positioned throughout conveyor 2, including idle roller 28, as will be described in more detail in the discussion of FIGS. 6A–B.

Referring to FIGS. 1B and C, frame members 8 and 10 include end plates 38 and 40 secured to or formed as part of the facing end portions thereof. Another pair of end plates is provided on the opposite side of the conveyor, but hidden from view. Each pair of end plates is similarly constructed and has associated therewith a hinge and hydraulic assembly which also are similarly constructed and arranged. Thus, the description of these elements only will be made with reference to the arrangement shown in FIGS. 1B and C for purposes of simplification. End plates 38 and 40 have edge faces 42 and 44 (FIG. 1C) which are configured or angled to abut one another and maintain frame member 8 substantially in the horizontal position when frame member 8 is lowered as illustrated in FIG. 1B. End plates 38 and 40 are pivotally connected to one another through hinge 46 which includes hinge flanges 46a which are secured to or formed as part of frame members 8 and 10. Hydraulic assembly 48 includes hydraulic cylinder 50 and actuation rod 52 as is conventional in the art. Hydraulic cylinder 50 is secured to end plate 40 of frame member 10, and actuation rod 52 is secured to plate 54, which, in turn, is secured to end plate 38 of frame member 8. The hydraulic cylinders are coupled to a common hose or tubing (not shown) which is coupled to a hydraulic control box (designated by reference numeral 56) coupled to a hydraulic fluid pump and including controls for delivering hydraulic fluid to the hose and hydraulic cylinders as is conventional in the art. In this way, the extension of rod 52 is controlled such that frame member 8 can be raised (FIG. 1C) or lowered (FIG. 1B). Frame member 10 is coupled to the truck through turret 6 such that frame member 10 is prevented from pivoting. In the raised position, the upper surfaces of frame members 8 and 10 are oriented such that the portion of conveyor belt 36 is supported thereby is maintained substantially flat (FIG. 1D).

Figure 2A:
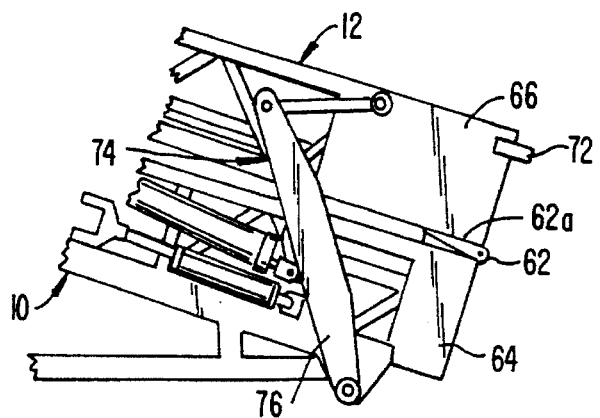
FIGS. 2A–D sequentially illustrate the main pivot and linkage assembly during the unfolding of the conveyor of FIG. 1A.
Figure 2B:
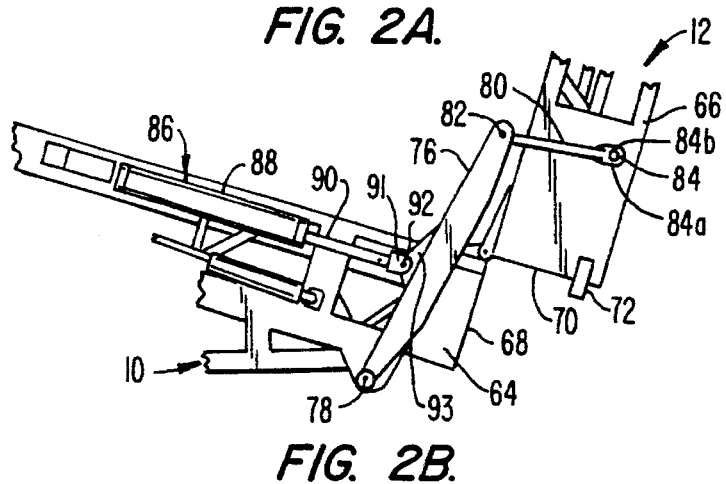
Figure 2C:
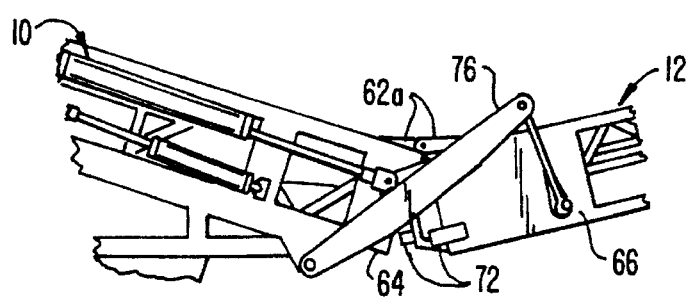
Figure 2D:
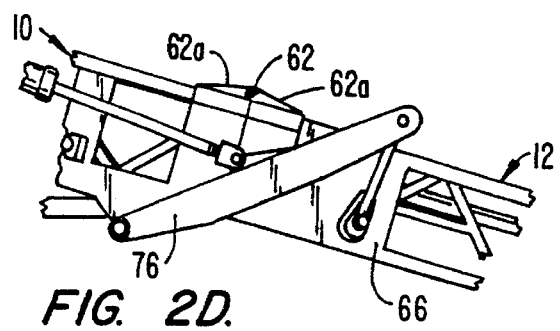

Referring to FIGS. 2A–D, one of the hinge and linkage assemblies provided between frame members 10 and 12 is shown at different positions during an opening sequence. Although an identical hinge and linkage assembly is provided on the opposite side of members 10 and 12, the following description will be made with reference to the hinge and linkage assembly illustrated in FIG. 2 for purposes of simplification. Frame members 10 and 12 are pivotally coupled to one another through hinge 62 which is similar in configuration to hinge 46 discussed above. Hinge 62 includes hinge flanges 62a which are secured to or formed as part of end plate portions 64 and 66 which are secured to or formed as part of frame members 10 and 12. End plates 64 and 66 have edge faces 68 and 70 which are configured such that when in abutting relationship, frame members 10 and 12 are oriented such that the portion of the conveyor belt 36 supported thereby is maintained substantially flat when unfolded as illustrated in FIG. 2D. Frame member 12 also is provided with flanges 72 which are secured to opposite sides of frame member 12, for example by welding, to engage the corresponding sides of frame member 10 and maintain members 10 and 12 in lateral alignment when the conveyor is in the unfolded (or use) position.

As can be seen while viewing FIGS. 2A–D, frame member 12 is pivoted from a transport position (FIG. 2A) to a work position (FIG. 2D) by linkage assembly 74. Referring to FIG. 2B, linkage assembly 74 includes a first link 76 having one end pivotally coupled to frame member 10 through shaft 78. Shaft 78 extends through an opening in link 76 and frame member 10, and through similar openings in the corresponding link and frame member portions hidden from view. In addition, shaft 78 is keyed to each of these links such that link 76 and its corresponding link move in unison. As evident from the above, shaft 78 is rotatably incorporated in frame member 10. The other end of link 76 is pivotally coupled to second link 80 by a typical pivot pin arrangement designated with reference numeral 82. Second link 80 is pivotally coupled to end plate 66 of frame member 12 at coupling 84. Coupling 84 comprises fixed shaft 84a and bearing 84b. Shaft 84a extends through frame member 12, and an opening in link 80 and its corresponding link hidden from view. Bearings 84b are provided between links 80 and shaft 84a. First link 76 is pivoted around pivot 78 by a conventional hydraulic assembly 86 having a hydraulic cylinder 88 secured to frame member 10 and a reciprocating piston rod 90 pivotally coupled to first link 76 at pivot point 92. Specifically, U-shaped coupling 91 has a base fixed to one end of piston rod 90 and a pair of side walls that extend from the base and are pivotally coupled to flange 93 which extends from link 76 as is conventional to one of ordinary skill. The hydraulic assemblies are coupled to control box 56 in a way similar to hydraulic assembly 48. The linkage arrangement described above provides certain advantages.

For example, it allows frame member 10 to be pivoted to the transport or unfolded position by a single stroke of piston rod 90. In addition, the connection between the hydraulic and the linkage assemblies need not be adjusted or repositioned throughout a complete cycle of folding or unfolding the conveyor.

Extension member 14 is slidably coupled to the distal end of frame member 12 through a pair of slide assemblies 178 (one being hidden from view) such that the extension member can be translated from a retracted position (FIG. 1D) to an extended position (FIG. 1E). Referring to FIG. 1F one of the two identical slide assemblies is shown. Slide assembly 178 includes side walls 180 which are secured to top wall 182, for example by welding. Rollers 184 are arranged to receive flange portion 186 of extension member rail 112, which preferably is in the form of an I-beam. Each roller 184 is rotatably mounted to one end of bolt 188. The other end of each bolt includes a typical washer 190 and nut 192, threadingly engaged therewith, for preventing the threaded end of the bolt from slipping through bolt hole 194. The rollers are distributed along the length of the slide assembly as would be apparent to one of ordinary skill. Rails 196 are secured to the lower portion of walls 180, for example, by screws 198, to protect rollers 184 from the environment.

Extension member 14 is locked in the retracted position for transport and in the extended position when conveying material by pin carriers 104, 106, and 108 and locking pin 110. The pin carriers are in the form of blocks, each having an axial bore for receiving locking pin 110 which includes a head having a diameter greater than that of the bore in carrier 104 such that pin 110 is prevented from inadvertently falling therethrough. Pin carrier 104 is secured to frame member 12 and pin carriers 106 and 108 are secured to extension member 14. Pin carriers 104 and 108 are positioned such that they are aligned when extension member 14 is retracted. Locking pin 110 is inserted through carriers 104 and 108 to prevent inadvertent translation or slippage of extension member 14 during transport. Pin 110 and carriers 106 and 108 are provided with cooperating locking mechanisms such as cooperating threads on the exterior surface of the pin and on the interior wall that forms the bores in the pin carriers. This ensures that the locking pin does not fall out of the pin carrier when frame member 12 and extension member are pivoted to the transport position, for example (FIG. 1A). When extension member 14 is extended beneath the container to be unloaded, e.g., rail car 94, locking pin 110 is used in conjunction with pin carriers 104 and 106 as illustrated in FIG. 1E. This prevents the extension member from sliding back and forth when the conveyor is in use, an advantage that will become more apparent from the description of FIGS. 3A and B below.

In one embodiment, extension member 14 includes hopper members 114 which are associated with laterally spaced side rails 112 of extension member 14 to increase the height of rails 112 when the extension member is extended. In this way, hopper members 114 form a bed for the material to be conveyed such that material is prevented from falling off the side of the conveyor belt. Each hopper member has one end pivotally coupled to the forward portion 14a of one of the side rails hinge 116. Each hopper member 114 includes segments 114a–d. Segment 114a is secured to segment 114b such that the angle formed therebetween generally corresponds to the angle formed between members 12 and 14. In this way, hopper members 114 conform to the configuration of side rails 112 and 120 of members 12 and 14 when extension member 14 is extended. As described above, hopper members 114 effectively raise the vertical dimension of side rails 112, which are otherwise generally flush with conveyor belt 36 for sliding in the slide mechanism 178. Hopper members 114 are constructed such that they can readily flex into a concave configuration when they contact bottom 200 or discharge gate 202 or rail car 94 during extension or retraction of the extension member. Preferably, hinges 204 are provided between segments 114*b* and *c* and 114*c* and *d* to provide such flexibility. A restraint mechanism also is provided to ensure that conveyor belt 36 follows the contour of the upper portions of members 12 and 14 to prevent belt 36 from rising and reducing the space between the bottom of the rail car and the conveyor. If the conveyor belt were permitted to rise, the conveying space would be reduced, thereby reducing the rate at which material could be conveyed. This is critical since the distance between the lowermost portion of gate 202 of rail car 94 and rails 96 of the railroad track when the gate is in the closed position is typically about 10 inches. That distance is shortened when the gate is opened to about 6 inches. The restraint mechanism comprises rollers 122 which are rotatably mounted to side rails 120 of frame member 12 adjacent to side rails 112 of extension member 14. Rollers 122 extend over a portion of conveyor belt 36 at the juncture between members 12 and 14 to maintain the concavity of the belt in this region and maintain the belt against the frame and extension members 12 and 14. End portions 114*a* of members 114 are configured to cover rollers 122 to prevent them from being damaged by the material being conveyed when members 14 are in the position illustrated in FIG. 1E. A conveyor belt guard 206 also is provided as shown in phantom in FIG. 1E. Guard 206 preferably is in the form of an L-shaped channel that extends between rails 112 of extension member 14. Guard 206 preferably is metal and is secured to the inner walls of rails 112 by welding, for example. Belt guard 206 is arranged to cover the forwardmost portion of belt 36 and the portion immediately therebeneath to protect the belt from sharp objects when extension member 14 is extended over rails 96 beneath rail car 94.

Figure 3A:
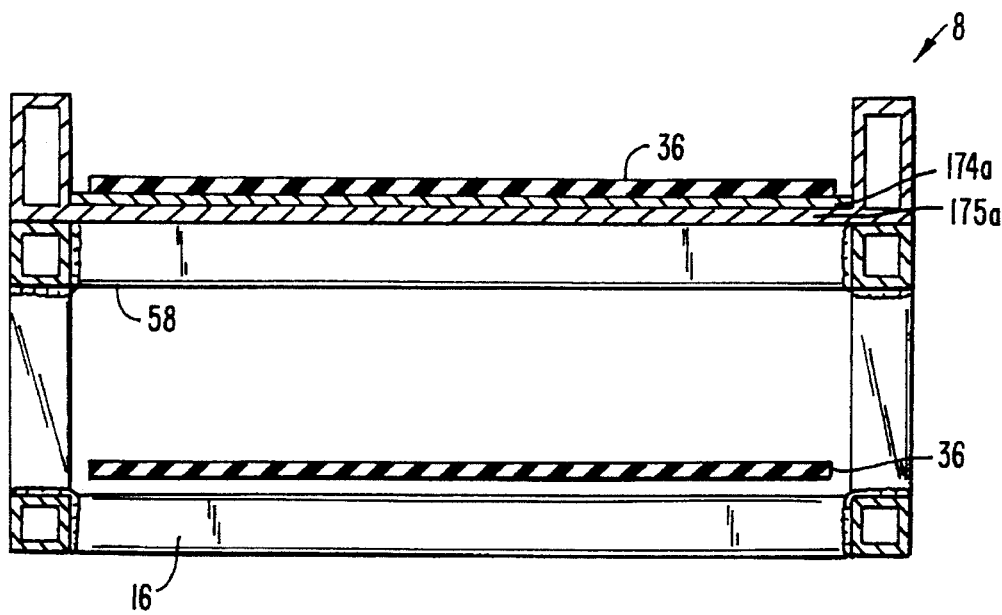
FIGS. 3A–B are sectional views of the conveyor showing the conveyor belt support structure for the conveyor bridge and extension member.
Figure 3B:
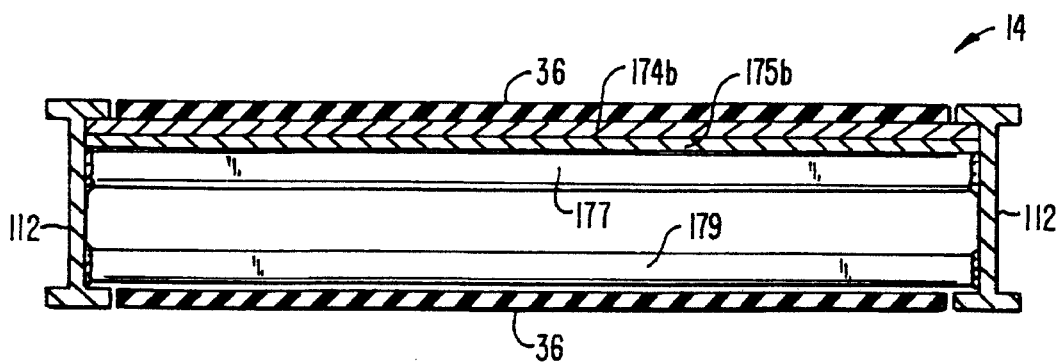

Referring to FIGS. 3A and B, the conveyor belt support structure is illustrated in accordance with a first embodiment of the invention. Referring to FIG. 3A, which is a sectional view of frame member 8, conveyor belt support member 174 is secured to plate 175 by bolts, for example. Plate 175 is secured to upper frameworks 58 of frame member or segment 8 by welding, for example. Support member 174 is preferably TEFLON® (polytetrafluroethene), a synthetic resin polymer and product, to minimize friction and, thus, wear of conveyor belt 36. It has been found that the amount of friction between the TEFLON® support member and conveyor belt does not cause excessive wear to the conveyor belt which is a concern when conveying heavy material such as rock and other aggregates. Referring to FIG. 3B, the conveyor belt support structure for extension member 14 is shown. Upper and lower frameworks 177 and 179 extend the length of extension member 14 and are secured to the inner walls of rails 112 (by welding, for example) to brace the rails in a laterally spaced orientation as shown. Plate 175*b* is secured to upper framework 177 and support member 174*b* (preferably TEFLON®) is attached thereto in the way the corresponding elements illustrated in FIG. 3A are secured to one another. In this way conveyor belt 36 is supported by support member 174*b*. Support members 174*a* and *b* have a generally uniform thickness of about ½ to 1 inch, and preferably about ⅝ inch when TEFLON® is used. As compared to conventional roller members placed beneath the load carrying portion of a conveyor, this construction allows the conveying portion of extension member 14 to have a relatively small height, thereby maximizing the space between conveyor 36 and the bottom surface of the container being unloaded such as rail car 94. This, in turn, maximizes the rate at which material can be conveyed from the container. It has been found that if a conventional roller type conveyor support is used, the height of the conveying portion of extension member 14 is increased to the extent that the space between the upper surface of the conveyor belt and the bottom surface of the container being unloaded is reduced, thereby restricting the rate at which material can be unloaded.

Figure 6A:
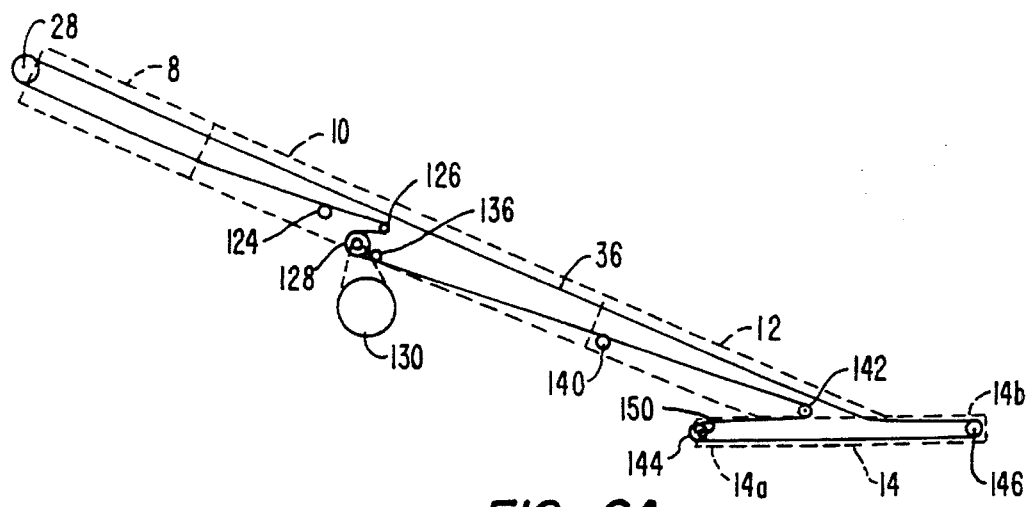
FIGS. 6A–B diagrammatically illustrate the way in which the extension member of the conveyor of FIG. 1A is extended.
Figure 6B:
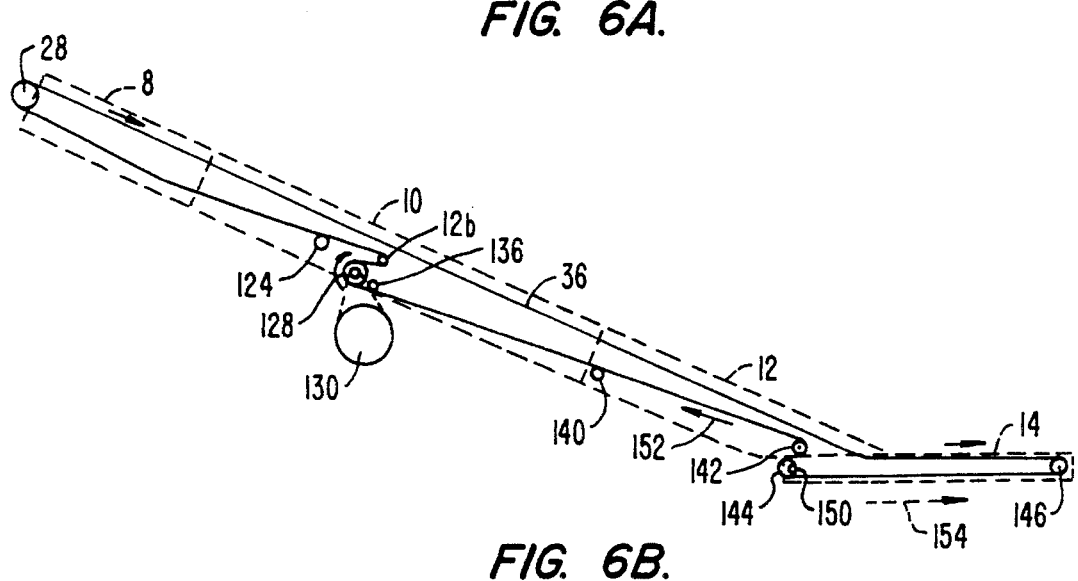
Figure 7:
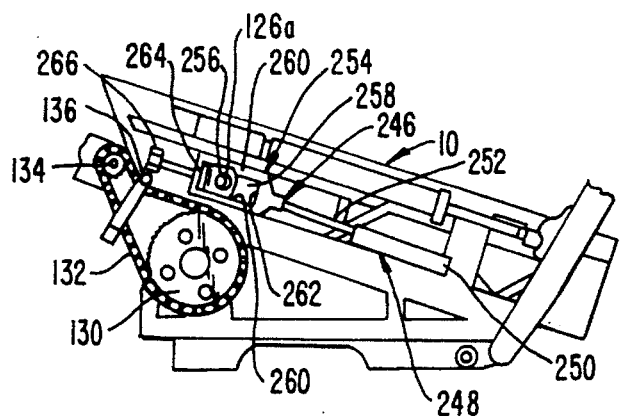
FIG. 7 is a side elevational view of a portion of the conveyor of FIG. 1A illustrating the conveyor belt drive mechanism.

FIGS. 6A and B diagrammatically illustrate the way in which the conveyor belt is used to drive extension member 14 from its retracted position (FIG. 6A) to its extended positions (FIG. 6B). As shown in the drawings, conveyor belt 36 is trained about idle rollers 28, 124, and 126, drive roller 128, and then about idle rollers 140, 142, 144, and 146 from where it returns along the upper side of extension member 14 and frame members 12, 10, and 8 to idle roller 28. It should be noted for purposes that will become apparent from the following description that idle roller 142 is rotatably coupled to frame member 12, while idle rollers 146 and 144 are rotatably mounted to the forward and rearward end portions 14*a* and 14*b*, respectively, of extension member 14. The idle rollers are mounted with bearings as is conventional in the art. A bearing housing 148 for the axle (not shown) of roller 142 is shown in FIG. 7 (the corresponding housing on the other side of frame member 12 being hidden from view). Drive roller 128 preferably has an outer surface of lagging rubber or a similar material that enhances the grip between the roller and the belt. Rollers 126 and 140 also are arranged relative to drive roller 128 to provide a scissor drive where the belt contacts a major portion of the drive roller's outer surface. Drive roller 128 and, thus, conveyor belt 36 are driven by drive sprocket 130. Drive sprocket 130 is driven by a gear reducer (e.g., 122:1) (not shown) which is driven by a conventional hydraulic motor (not shown). The hydraulic motor is driven by a variable pitch hydraulic pump (not shown) that is directly coupled to the drive shaft of the truck motor as is conventional in concrete mixer trucks which have hydraulic systems to turn the concrete drum. Referring to FIG. 7, drive sprocket 130 drives drive chain 132, which in turn drives sprocket 134. Sprocket 134 is fixed to drive roller 128 such that drive roller 128 is rotated therewith. The tension of drive chain 132 is adjusted by way of pressure roller 136 which is slidably mounted to frame 10 as is conventional to one of ordinary skill. This drive assembly is covered by a conventionally constructed protective cage or shroud 138 (FIGS. 1B–D).

To facilitate the reciprocation or translation of extension member 14, a braking assembly, diagrammatically represented in FIGS. 6A and B and designated by reference numeral 150, is arranged to cooperate with roller 144. When brake assembly 150 (described in detail below) is actuated to prevent rotation of idle roller 144, conveyor 36 effectively becomes locked to idle roller 144 and discontinues travel thereabout due to the frictional forces therebetween that result from the tension and weight of the conveyor belt on roller 144. When conveyor belt 36 is effectively locked to idle roller 144, and drive sprocket 130 is rotated, the conveyor belt translates the extension member either forward or rearward depending on the rotational direction of sprocket 130. For example, to translate extension member 14 forwardly and beneath a container, such as rail car 94, locking pin 110 is removed from pin carriers 104 and 108, the brake assembly 150 is actuated to lock conveyor belt 36 to idle roller 144 and prevent it from travelling around roller 144, and drive sprocket 130 is rotated in a clockwise direction such that conveyor belt 36 also moves clockwise. As the portion of conveyor belt 36 rearward of idle roller 142 moves clockwise, as designated by arrow 152, the portion of conveyor belt 36 between idle roller 142 and 144 pulls the rearward portion 14b of extension member 14 forward as designated by arrow 154. Once extension member 14 has reached the position shown in FIG. 3B and the portion of conveyor belt 36 previously behind idle roller 142 is taken up, drive sprocket 130 is deenergized to prevent damage to the drive sprocket power source (not shown) since further movement of conveyor belt 36 in the clockwise direction is prevented. Once brake assembly 150 is deactuated such that idle roller 144 is free to rotate and locking pin 110 is inserted through pin carriers 104 and 106 as illustrated in FIG. 1E, drive sprocket 130 and, thus, conveyor belt 36 can be rotated in the counterclockwise direction to convey material deposited on extension member 114 along the conveyor.

Figure 8:
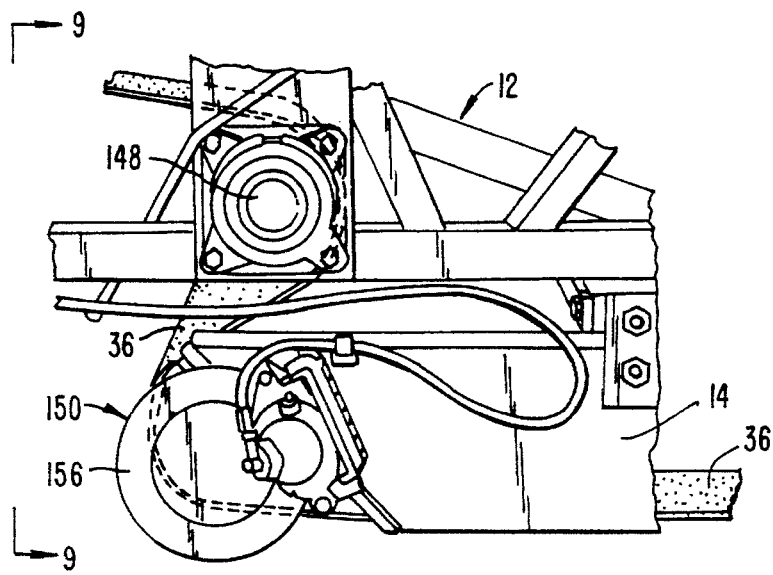
FIG. 8 is a side elevational view of the locking mechanism that actuates the translation of the extension member.
Figure 9:
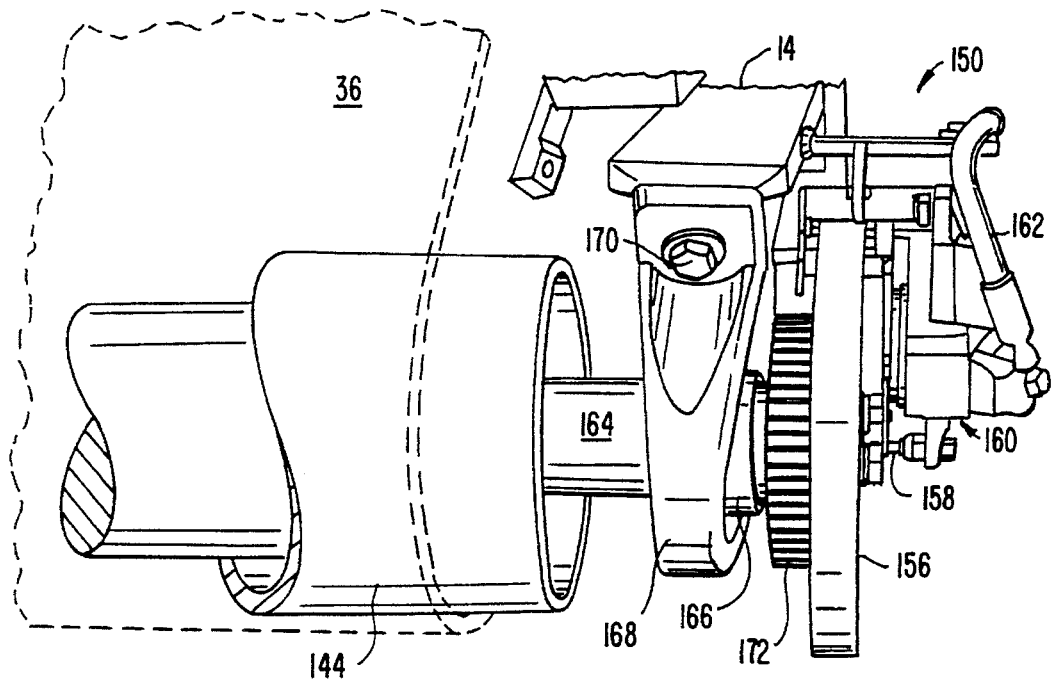
FIG. 9 is a front elevational view of the locking mechanism taken along lines 5—5 of FIG. 5.

Referring to FIGS. 8 and 9, disk brake assembly 150, which is of conventional design, is illustrated. Brake assembly 150 includes disk 156, pressure pads 158 (the pressure pad on the left side of disk 156 being hidden from view), and hydraulic calipers 160 (the left-side calliper also being hidden from view). Calipers 160 are actuated to engage pads 158 with disk 156. Tubing 162 couples the hydraulic calipers to control panel 56 for remote actuation of the brake assembly. Idle roller 144 includes a central shaft or axle 164 mounted within bearing 166 that is housed in casing 168 which in turn is secured to extension member 14 by welding or fasteners such as bolts 170 (the rearward bolt being hidden from view). A spacer 172 is provided around axle 164 to space bearing 166 from disk 156. Shaft 164 extends through an opening in spacer 172 and is fixed to disk 156 such that relative movement between shaft 164 and disk 156 is prevented. Thus, actuation of brake assembly 150 prevents rotation of roller 144 such that member 14 is translated.

Figure 4A:
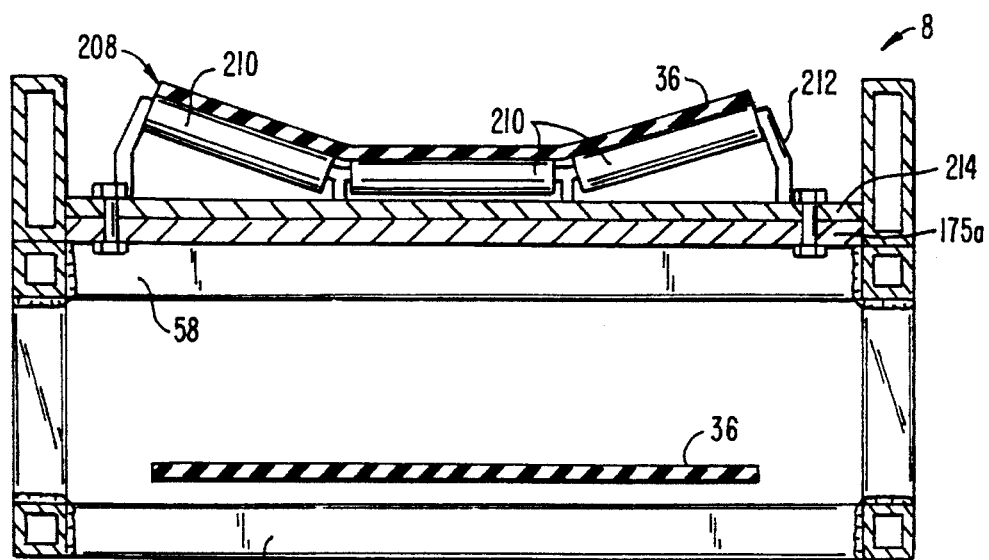
FIGS. 4A–B are sectional views of the conveyor of FIG. 1A showing another embodiment of the conveyor belt support structure for the conveyor bridge and extension member.

Referring to FIGS. 4A and B, another embodiment of the conveyor belt support structure, which is trough shaped, is shown. Referring to FIG. 4A, which is a sectional view of frame member 8, plate 175 a is secured to upper framework 58 of frame member 8 as in the embodiment illustrated in FIG. 3A. A plurality of conveyor troughing rolls 208, which support conveyor belt 36, are positioned along plate 175a, preferably at 36 inch centers. Such troughing rolls assemblies are commercially available. One suitable troughing roll is model no. B402 which is available from Hewitt-Robbins Corp., New Jersey. Each troughing roll 208 includes rolls 210 rotatably supported by bracket 212 which is mounted to base 214. Base 14 is secured to plate 175a (e.g., by bolts). The outer rolls are angled at about 15° to 20°, preferably about 20°, to base 214 to form the desired conveyor bed size. The rolls also are preferably about 4–5 inches in diameter. The support structure incorporating troughing rolls as illustrated in FIG. 3A is the same for frame members 10 and 12 except that the support member support plate is secured to upper frameworks 60 and 61 of members 10 and 12. The troughing rolls arrangement is especially advantageous when conveying heavy materials in that less power is required to drive conveyor belt 36 than is used in the embodiment of FIG. 3A.

Figure 4B:
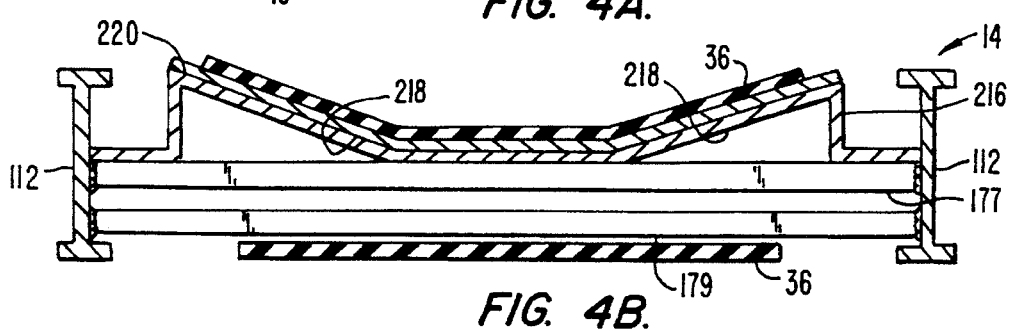

Referring to FIG. 4B, the trough shaped conveyor belt support structure for extension member 14 is shown. A trough shaped plate 216 is positioned on upper framework 177 and secured to the inner surfaces of the webs of side rails 112 (e.g., by welding). Plate 216 includes inclined sections 218 which are inclined relative to framework 177 at an angle similar to that described relative to the troughing rolls (preferably 20°). This angle has been found to form an appropriate conveyor bed, while maintaining the height of extension member 14 at a minimum to facilitate use in the limited space beneath a rail car. A sheet of TEFLON® or other material having a low coefficient of friction 220 is bolted or otherwise secured to plate 216 to form a surface upon which conveyor belt 36 can effectively slide. When TEFLON® (the preferred material) is used, sheet 220 has a thickness of about ½ to 1 inch, and preferably ⅝ inch. The TEFLON® support member enables the extension member to be dimensional for effective placement beneath a rail car by reducing the height of the member as compared to an extension member incorporating troughing rolls. It also has been found that the trough shaped support structure of FIG. 4A–B, also reduce or eliminates the occurrence material accumulating beneath the conveyor belt. Another advantage of incorporating the trough shaped support structure in extension member 14 is that it eliminates the need for hopper assemblies 114 in that the bed is formed by the trough independently of side rails 112.

Figure 5:
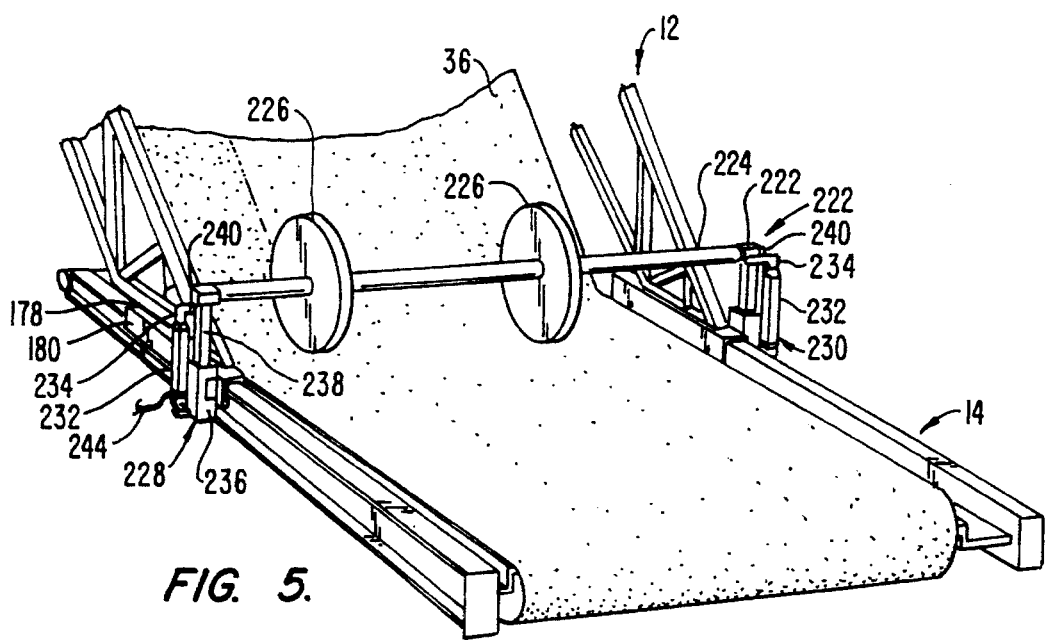
FIG. 5 is a perspective view of another embodiment of the conveyor belt restraint mechanism illustrated in FIG. 1D.

Referring to FIG. 5, an alternate embodiment for the conveyor belt retaining mechanism (roller 122) is illustrated in FIG. 1D. Retaining mechanism 222 generally includes cylindrical shaft 224, wheels 226, and raising devices 229 which are coupled to hydraulic assemblies 230 including hydraulic cylinder 232 and piston rod 234 as is conventional in the art. Each raising device 228 includes tubular member 236 and shaft support column 238 which is slidably mounted within member 236 which, in turn, is welded or otherwise secured to side wall 180 of slide assembly 178. Each column 238 is secured to one of the piston rods 234 through connector 240 and to a bearing housing 242. Each bearing housing includes a bearing for rotatably supporting one end of shaft 224. Hydraulic cylinder 232 is pivotally secured to tubular member 236 and coupled to hydraulic control box 56 through hydraulic tubing 244 such that the height of shaft 224 and, thus, wheels 226 relative to conveyor belt 36 can be remotely controlled. In this way, wheels 226 can be positioned against conveyor belt 36 to prevent the belt 36 from lifting away from the juncture between frame member 12 and extension member 14. Accordingly, belt 36 is prevented from being cut by the bottom of rail car 94. The space between the belt and discharge gate is also maximized to enhance material flow. The wheels preferably have a diameter of about 18 inches to allow a sufficient amount of material to pass beneath shaft 224. Wheels 226 also are about ½ inch thick and about 3 inches in from the outer edges of the conveyor troughing roll. As this dimension increases, the wheel moves deeper into the trough and interferes with the flow of the material. As this dimension decreases, the belt tends to bow and form a convex surface from which material readily falls. The wheel height adjustment feature also allows the wheels to be raised (without shutting down the conveyor) when large pieces of material jam between the wheels and the conveyor belt. The wheels then continue to ride on the material and provide pressure on the conveyor therethrough. It should be noted that wheels 224 should be positioned against belt 36 while folding or unfolding the conveyor to maintain the belt in place. This is not a concern with roller 122 as rollers 122 are not similarly adjustable.

Returning to FIG. 7, a mechanism for adjusting the tension of conveyor belt 36 is generally designated with reference numeral 246. An identical adjustment mechanism is provided on the opposite side of the conveyor, but hidden from view. Each adjustment mechanism 246 includes a conventional hydraulic assembly 248, which includes hydraulic cylinder 250 and piston rod 252, yoke assembly 254 pivotally coupled to one end of piston rod 252, and a slide bearing housing 256 slidingly coupled to frame member 10. The yoke assembly and sliding bearing housing are commercially available elements. Yoke assembly 254 is slidingly mounted in a channel (not shown) in frame member 10 such that the extension or retraction of piston rod 252 causes corresponding rectilinear translation of yoke assembly 254. The hydraulic cylinders are coupled to control box 56 by a common hydraulic hose so that the yoke assemblies are moved in unison. As shown in the drawings, yoke assembly 254 forms a rectangular opening 258 in which bearing housing 256 can slide. The rectangular opening is formed by upper and lower walls 260, proximal wall 262 and distal wall 264. Each bearing housing 256 (one being hidden from view) rotatably supports one end of shaft 126a of idle roller 126. Thus, when piston rod 252 is retracted, distal wall 264 of yoke assembly 254 forces bearing housing 256 to the right to remove slack in conveyor belt 36 and adjust its tension. Adjustment bolt 266 has threads for cooperating with threaded hole in distal wall 264. When bolt 266, which abuts distal wall 264, is rotated, the distance between bearing housing 256 and distal wall 264 can be adjusted. In this way bolt 266 provides a fine adjustment to the tension of belt 36. This feature is especially important when folding the conveyor into the transport configuration (FIG. 1A), where belt 36 must be loosened to accommodate the bends and turns in the conveyor system. On the other hand, the belt must be tightened after it is unfolded to provide adequate tension for brake assembly 150 to effectuate the extension of extension member 14.

The hydraulic system includes a hydraulic pump mounted to the transmission of the truck as is conventional in the art. The pump is coupled by hydraulic tubing to two valve bodies of typical construction and being in the same general vicinity. The first valve body (not shown) has four separately controllable valves for actuating a set of four standard outriggers or braces 176. The two outriggers hidden from view are arranged on the opposite side of the truck in corresponding positions relative to the outriggers shown. The first and second valve bodies are separated so that the outrigger controls are separate from the remaining systems to satisfy certain safety requirements. The other valve body generally makes up control box 56 and preferably includes about eight separate controllable valves. Five valves are used to independently control the delivery of hydraulic fluid to the hydraulic assemblies 48, 86, 248, 160 and 230 for raising/lowering frame member 8, raising/lowering frame member 12, adjusting the tension of conveyor belt 36, actuating brake assembly 150, and raising/lowering belt restraining wheels. It should be understood that the hydraulic cylinders are two-way cylinders so that the associated piston rods can be both extended and retracted under power. Another valve is provided for independently controlling the hydraulic system for rotating turret 6. The turret and associated hydraulic system provided with a standard commercially available 10 ton portable hydraulic crane (e.g., available from Grove Worldwide., Pa.) has been found to provide the desired results. At two additional independently controlled valves are included with control box 56 to provide capacity for powering auxiliary hydraulic equipment, such as a hydraulic rail car vibrator.

For purposes of example, the preferred steps for unloading a rail car will be described. The conveyor truck is driven to a rail car site and then positioned parallel to the rail car desired to be unloaded. Outriggers or braces 176, which are pivotally secured to the truck, are hydraulically pivoted as is conventional in the art such that they are planted firmly on the ground. As evident from the above, the outriggers stabilize the truck and prevent it from tipping when the conveyor is later rotated. Although standard commercially available pivoting outriggers are shown, standard nonpivoting vertically reciprocating outriggers can be used. Hydraulic members 48 and 86 are actuated to unfold conveyor 2. Once the conveyor is partially unfolded, it is rotated by turret assembly 6 to a position generally normal to the truck. The conveyor is then completely unfolded as illustrated in FIG. 1D. In this position, the truck, being generally normal to the conveyor, provides stability to the conveyor. With forward portion 14a of extension member 14 positioned along the side of the rail car, the conveyor is ready to be extended beneath rail car 94. Pin 110 is removed from carriers 104 and 106, hydraulic assembly 248 retracted to tension belt 36, and brake assembly 150 actuated to effectively lock belt 36 to roller 144. Drive assembly 130 is rotated clockwise (FIG. 6B) to translate extension member 14 over rails 96 above cross-ties 98 and ballast 100 (FIG. 1E). When the extension member is fully extended, the drive and brake assemblies are deenergized and pin 100 placed through pin carriers 104 and 108 to lock extension member 14 in place. In some instances, the extension member will not lie flat on rails 96 due to the rails being uneven or variations in the height of the ground adjacent rails 96, for example. When this occurs, the outriggers are adjusted to pivot the entire conveyor such that extension member 14 lays flat on the rails and the space between the conveyor belt and the rail car discharge gate is maximized. For example, when the forward portion 14a is above the outside rail, the outriggers on the side of the truck opposite the extension member (those hidden from view) are actuated to raise that side of the truck to pivot the conveyor and position extension member against both rails 96.

Once the extension member is properly positioned, drive assembly 130 is rotated counterclockwise and discharge gate control device 270 actuated to open discharge gate 202 of rail car 94 and discharge material 102 onto conveyor belt 36 (FIG. 1G). Control device 270 includes a conventional hydraulic assembly 272 having a piston rod 174 and conventional two-way hydraulic cylinder for extending or retracting the piston rod. Cylindrical tube 278 is secured to the piston rod so as to travel therewith. A working head 280 having a plate shaped configuration to securely wedge between channel 282 (which is attached to gate 202) and gate 202, is fixed to one end of tube 278. At the other end of control device 270 latch mechanism 284 is secured to hydraulic cylinder 276. Mechanism 284 includes a generally flat head having a V-shaped groove 286 formed therein for receiving cross-plate 288 which is fixed to the bottom surface of rail car 94. During installation, latch mechanism 284 is positioned to engage plate 288. Piston rod is then extended such that head 280 is securely wedged between gate 202 and channel 282. Hydraulic tubing (not shown) couples cylinder 276 to a source of hydraulic fluid and, thus, can be coupled to one of the auxiliary valves of control box 56. It should be understood that other configurations for members 280 and 284 can be used to securely position control device 270 against gate 202. The hydraulically powered gate control device allows the gate to be pivoted through hinge arms 290, which are attached to gate 202, about pivot 292 at a controlled rate when the weight of the material in rail car 94 otherwise tends to force the gate open.

In this way, the volume of material deposited on the conveyor is controlled. Control device 270 also allows the gate to be closed when a substantial amount of cargo, or material remains in rail car 94. The discharge gate and hinge assembly therefor are of standard construction and commercially available on bottom-dump rail cars.

Conveyor belt 36 then conveys the material up frame members 8, 10, and 12, which are angled to the horizontal and extension member 14 a sufficient degree to reach the location where the material is to be deposited. The angle between extension member 14 and the frame members is preferably about 15–19 degrees when conveying the material to the open top of a truck with a conveyor length of about 50 ft. After the rail car is unloaded, the extension member is retracted and frame member 12 raised sufficiently from the ground so that the truck can be driven to the next rail car at the site to be unloaded. It has been found that with the elements of the conveyor positioned generally as shown in the drawings (e.g., the belt drive mechanism is positioned above the truck), the conveyor can be balanced so that the outriggers can be raised and the truck driven at low speed with the conveyor unfolded as shown in FIG. 1D. If necessary, counterweights can be provided to balance the conveyor to facilitate driving from rail car to rail car as described above.

A driving station outside of the truck cab is provided so that the conveyor system can be readily driven from car to car. Referring to FIGS. 1A–D, remote cab 94 includes a remote drive, steering, and braking system as typically provided in conventional municipal garbage trucks. The remote steering system is generally designated with numeral 296. Generally, the truck has an automatic transmission with two electric shifts—one inside the main truck cab and one at remote cab 294. The remote steering and brake systems are arranged in parallel with the steering and brake systems in the main cab. The remote cab allows the operator to work from one location with better visibility when positioning the conveyor. It also eliminates the need for getting in and out of the cab numerous times per day when using the conveyor.

The sizes and materials used to make up mobile conveyor system 1 may be selected from a wide variety of sizes and/or materials. Merely to exemplify a preferred makeup of the components which has been found to produce the desired effects in unloading rail cars, the following may be recited. The frame members 8, 10, and 12, and extension member 14 preferably are mild carbon steel. The conveyor length is about 50 ft. from one end to the other when unfolded and extension member 14 extended. The width of conveyor belt 36 is about 4 ft. Truck 2 is preferably of three axle design in order to support the weight of the conveyor and material being conveyed.

The above is a detailed description of a particular embodiment of the invention. It is recognized that departures from the disclosed embodiment may be made within the scope of the invention and that obvious modifications will occur to a person skilled in the art. The full scope of the invention is set out in the claims that follow and their equivalents. Accordingly, the claims and specifications should not be construed to unduly narrow the full scope of protection to which the invention is entitled. For example, although the conveyor system is illustrated unloading a rail car, it should be understood that the system can be used for loading rail cars as well by reversing the conveyor position such that frame member 8 is above the open top of a rail car and extension member 14 is positioned beneath or adjacent a source of material to be conveyed.

What is claimed is:

1. A method of unloading rail cars comprising the steps of:

providing a truck with a conveyor mounted thereto at a coupling and having first and second end portions;

transporting the conveyor with the truck to a rail car to be unloaded;

positioning the conveyor over the truck with the first end portion of the conveyor in the vicinity of a deposit site and the second end portion spaced-apart from the rail car, wherein the conveyor is positioned by horizontal rotation of the conveyor about the coupling;

axially translating the second end portion relative to the first end portion to a position beneath the rail car;

discharging cargo from the rail car to the second end portion of the conveyor; and conveying the discharged cargo to the first end of the conveyor for transfer to the deposit site.

2. The method of claim 1 wherein the transporting step includes transporting the conveyor with the conveyor folded, and the positioning step includes unfolding the conveyor.

3. The method of claim 2 wherein the conveyor is rotated about the coupling after the conveyor is unfolded.

4. The method of claim 1 wherein the positioning step includes extending the length of the conveyor between the first and second end portions to position the second end portion beneath the rail car.

5. The method of claim 1 wherein the moving step comprises translating the second end portion away from the first end portion from a position laterally spaced from the rail car to a position beneath the rail car.

6. A method of unloading rail cars comprising the steps of:

providing a truck with a conveyor rotatably mounted thereto and having first and second end portions;

transporting the conveyor, via the truck, to a rail car to be unloaded with the conveyor at least partially folded;

unfolding the conveyor and positioning it over the truck with the first end portion of the conveyor in the vicinity of a deposit site and the second end portion laterally spaced from the rail car;

translating the second end portion relative to the first end portion to a position beneath the rail car;

discharging cargo from the rail car to the second end portion of the conveyor; and conveying the discharged cargo to the first end portion of the conveyor for transfer to the deposit site.

\* \* \* \* \*